Dec. 9, 1952 R. W. HOAGLAND 2,621,262

TELEPHONE HANDSET SUPPORT

Filed Sept. 11, 1947 3 Sheets-Sheet 1

INVENTOR

Reginald W. Hoagland

Dec. 9, 1952 R. W. HOAGLAND 2,621,262

TELEPHONE HANDSET SUPPORT

Filed Sept. 11, 1947 3 Sheets-Sheet 2

INVENTOR

Reginald W. Hoagland

TELEPHONE HANDSET SUPPORT

Filed Sept. 11, 1947

3 Sheets-Sheet 3

INVENTOR

Reginald W. Hoagland

Patented Dec. 9, 1952 2,621,262

UNITED STATES PATENT OFFICE 2,621,262

TELEPHONE HANDSET SUPPORT

Reginald W. Hoagland, Detroit, Mich.

Application September 11, 1947, Serial No. 773,457

5 Claims. (Cl. 179—149)

This invention relates to devices for mechanically supporting the part of a telephone normally held by one hand of the user while conducting a telephone conversation.

The principal object of the invention is to provide a telephone support held in place by one part of a two-piece telephone and movable to an operative position for supporting the other telephone part when the user of the telephone desires both hands free for other purposes, or movable to an inoperative out-of-the-way position where said support will be obscured from view by the telephone and where it does not interfere with complete use of the telephone in the customary manner.

Another object of the invention is the provision of a pair of pivotally connected members, one member being engaged by and stationary with the base unit of the telephone, while the other member is movable about said pivotal connection either to a position extending upwardly and forwardly from said base unit for detachably supporting the transmitter and receiver unit of the telephone, or to a position extending rearwardly along side the base unit when not in use as a support for the transmitter and receiver unit.

A further object is to provide an adjustable and yieldable stop for a pivoted transmitter and receiver unit supporting member that has an adjustable frictional connection at its pivot, for positioning and supporting said telephone unit at slightly different elevations at different adjustments of the stop.

Still another object of the invention is to provide two supporting members, one for each unit of a two-unit telephone, said members being constructed and connected together in such a manner that the weight of the base unit of the telephone and its supporting member is sufficient to maintain same in proper upright position and against overbalancing by the combined weight of the transmitter and receiver unit and its supporting member in all adjusted positions.

It is also an object of the invention to provide a spring clip on the free end of the movable supporting member for detachable connection with the transmitter and receiver unit of the telephone, said clip being constructed with yieldable spaced jaws between which the hand-engaging portion of said telephone unit is forced and yieldably held by engagement of said jaws thereabout.

These and other objects and advantages and the manner in which they are attained will become apparent from the following detailed description of the embodiments of the invention selected for illustration.

Figures 1, 2, 6, 7, 8, 9, 10:
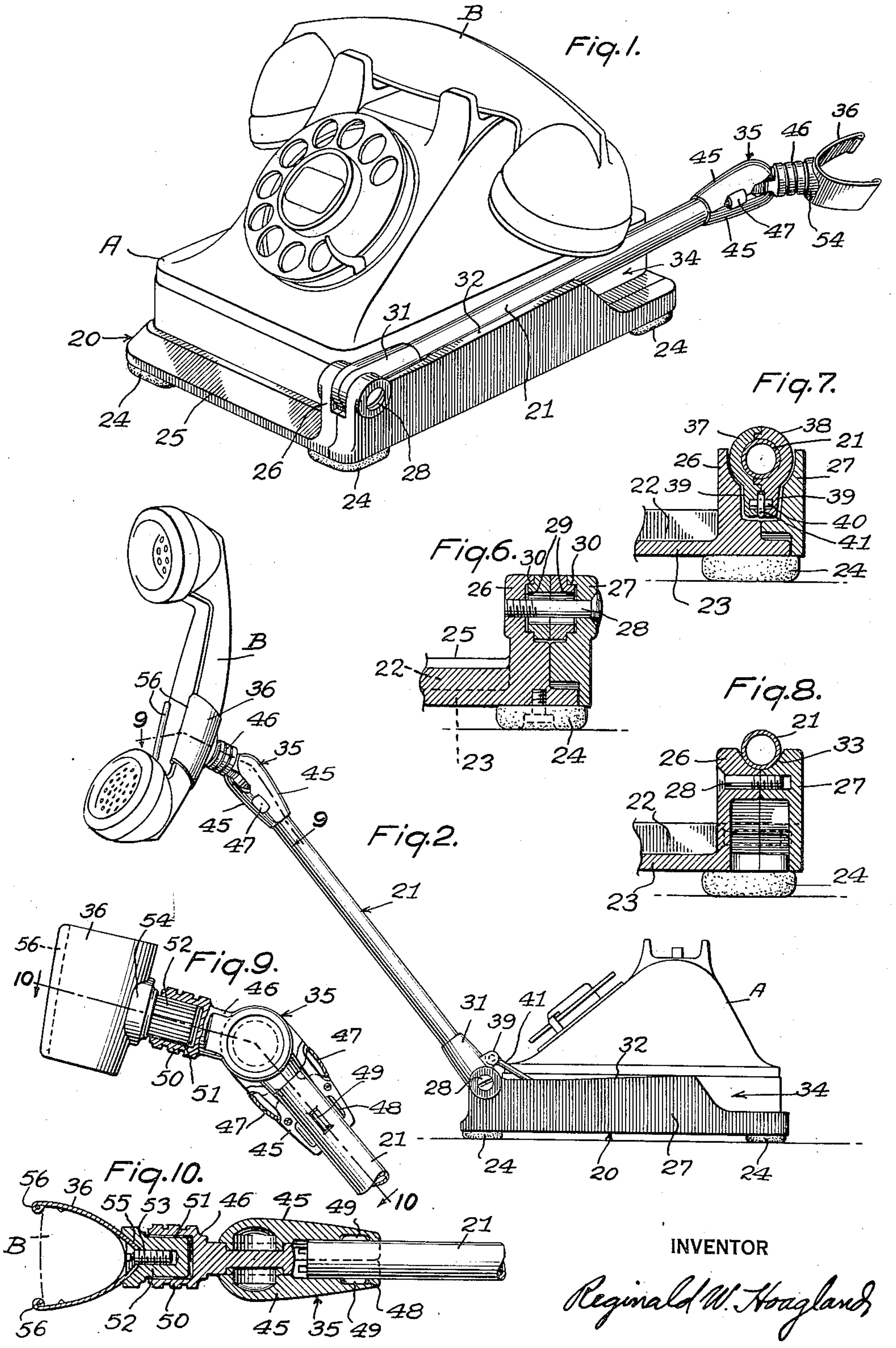
Figure 1 is a perspective view of the improved support and a telephone when not in use.
Figure 2 is a side elevation showing the support in operative position supporting both parts of a telephone.
Figure 6 is a fragmentary cross section on line 6—6 of Figure 4.
Figure 7 is a similar section on line 7—7 of the same figure.
Figure 8 is also a similar section on line 8—8 of Figure 4.
Figure 9 is an elevation and section through the free end of the movable arm substantially on line 9—9 of Figure 2.
Figure 10 is a longitudinal section taken on line 10—10 of Figure 9.

The telephone illustrated is of the conventional two-piece type, having the base unit A thereof constructed with the usual rectangular box-shaped lower portion from which extends upwardly set-in sides and converging front and rear walls to provide an elevated rest structure with circuit making and breaking buttons for supporting the transmitter and receiver or handset unit B when the telephone is not in use.

Referring to my improved support, a base member indicated in its entirety by the reference numeral 20, upon which rests the base unit A of the telephone, is provided for the purpose of supporting a movable arm generically indicated by the numeral 21 in either a position extended forwardly and upwardly therefrom with the transmitter and receiver unit B of the telephone supported thereon or in a non-supporting position resting on said base member in close proximity to one side of the rectangular lower portion of the base unit of the telephone and obscured from view by said base unit of the telephone.

The base member 20 has the major portion of its upper surface recessed, as at 22, by flanging upwardly the opposite sides and ends of a rectangular bottom plate 23, for receiving and supporting therein the extreme lower portion of the telephone base unit A. On the undersurface of the bottom plate 23, at each corner thereof, is attached a cushioning foot 24 for slightly elevating the bottom plate 23 from the surface of the desk or table upon which it rests to prevent marring of said surface when placed thereon and moved thereover.

While one side and the rear end of the bottom plate 23 have narrow flanges extending upwardly, the front end and other side are flanged differently, as at 25 and 26 respectively. The flange 25 at the front is of increased width for the purpose of locating the feet 24 thereunder slightly forward and in the direction the movable arm 21 extends when supporting the transmitter and receiver unit to preclude overbalancing of the device and telephone. Side flange 26 varies in height throughout its length and is constructed to provide one longitudinal half of the attaching and supporting structure for the movable arm 21 when in both its operative and inoperative positions.

A plate 27 of the same size and configuration flange 26 by the screws 28 and provides the other flange by the screws 28 and provides the other longitudinal half of a ledge to which the arm is attached and supported. At the forward ends of the flange 26 and plate 27 and extending from their abutting surfaces are annular recesses 29, as clearly shown in Figure 6 of the drawings, to receive and provide enlarged bearing surfaces 30 that engage an end element 31 of the movable arm 21 for pivotally connecting said arm 21 to the base member 20. One of the screws 28 that retain the plate 27 against the flange 26 extends through the plate 27 and the end element 31 of the arm 21 and is threaded into the flange 26 for applying pressure against the opposite sides of the bearing surfaces of the end element 31 for frictionally holding the arm 21 against excessive free movement.

Figures 3, 4, 5:
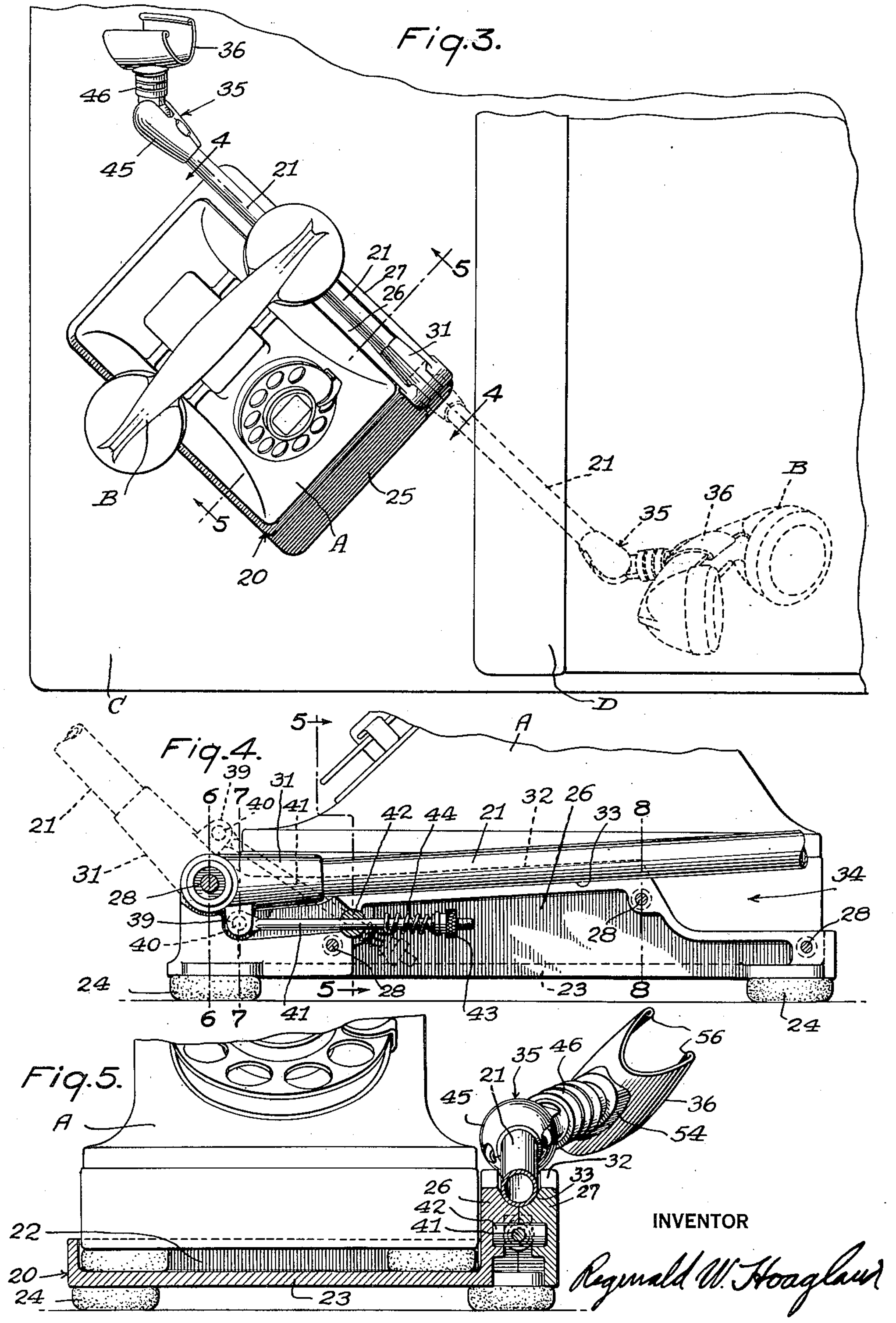
Figure 3 is a plan view showing in full lines the support and a telephone resting on a desk when not in use and showing in dotted lines the position of the transmitter and receiver unit when supported for use.
Figure 4 is a vertical longitudinal section on line 4—4 of Figure 3.
Figure 5 is a vertical cross section on lines 5—5 of Figures 3 and 4.

By referring to Figs. 1, 2 and 3, it will be observed that the pivotal connection of the arm 21 to the base member 20 is in advance of the forward wall of the lower rectangular portion of the base unit A and is elevated to slightly a lower plane than the top of said lower rectangular portion, which is for the purpose of locating said pivotal connection in close proximity to the base unit A where it will not be unsightly, yet advanced to a point where the shortest possible supporting arm 21 can be used to extend the transmitter and receiver unit B upwardly and forwardly the greatest distance. By keeping the arm 21 short in length and locating its pivotal connection in the manner shown and described, said arm will extend a less distance beyond the rear of the base unit A when in an inoperative position.

Rearwardly of the pivotal connection of the movable arm 21 to the side flange 26 and plate 27, said flange and plate have their upper surfaces slightly inclined upwardly as they extend rearwardly, as at 32, and provided with a semicircular groove 33 into which the movable arm 21 rests when moved to its inoperative position. The inclined elevated arm rest portion of the flange 26 and plate 27 terminates short of the rear of the base member to provide a space, as indicated by the numeral 34 in Figures 1 and 4, for permitting convenient hand engagement of the arm 21 to manually swing the same to both operative and inoperative positions.

The arm 21 is of tubular construction for the purpose of reducing weight and in addition to having the element 31 at the end pivoted to the base member 20, has on its opposite end a frictional type universal joint 35 by which is carried a spring clip 36 for detachable connection with the hand-holding portion of the transmitter and receiver unit B of the telephone. The end element 31 and the frictional universal connection 35 on opposite ends of the arm 21 are not entirely new in so far as this invention is concerned, therefore, certain details of their construction do not form a part of this invention. However, as these elements are associated and perform functions in conjunction with features of this invention, the detail construction thereof will be described.

The end element 31 is constructed of longitudinal halves 37 and 38 which when placed between the flange 26 and plate 27 with the end of the arm 21 therebetween, tightly engage about said arm so that said end element 31 operates as a rigid part of the arm 21. Each of the halves 37 and 38 has an off-set lug 39 which are opposite one another and engage over the opposite ends of a pin 40 that pivotally connects to one side of the end element 31 one end of a link 41 that extends rearwardly through an opening in a pin 42 which has its opposite ends pivotally supported in recesses formed in the flange 26 and plate 27. On the rear end of the link 41 is threaded a thumb nut 43, while on link 41 between the nut 43 and pivoted pin 42 is a coil spring 44 which engages both pivoted pin 42 and thumb nut 43 when arm 21 is swung to an operative position for yieldably limiting extended movement of the arm 21. In order that the lugs 39, like 41, thumb nut 43 and spring 44 may be completely concealed between the flange 26 and plate 27 when the arm 21 is in inoperative position and said parts may have ample freedom of movement, said flange 26 and plate 27 have a number of grooves or recesses formed in their adjacent sides, as shown in Figures 4, 5 and 7.

The universal joint 35 has end members 45 and 46 pivotally connected together and connected to the arm 21 and spring clip 36, respectively. End member 45 is constructed of longitudinally split halves held together by a pair of small spring clips 47 and engages about the cylindrical end of the tubular arm 21 for turning movement thereon and with opposite faces of both ring and annular bearing surfaces on the end member 46 for pivotal movement. A semi-circular groove 48 is provided in each half of the end member 45 which together provides an internal annular groove into which extend outstruck projections 49 from the tubular arm 21 for holding the end member 45 against sliding movement endwise on the arm. As previously mentioned, the universal joint 35 is of the frictional type which when manually forced to adjusted position where the transmitter and receiver unit is most convenient to the user, the parts thereof will remain in such position and not be affected by the weight of the transmitter and receiver unit B.

The end member 46 of the universal joint 35 has a cylindrical extension 50 thereon provided with splines 51 interiorly thereof that engage similar splines provided on the exterior of a plug 52 rigidly fixed to the spring clip 36 by a screw 53. The spline connection 51 permits, by pulling out and replacement, adjustment of the position of the spring clip with respect to the turning axis of the pivotal connection of the end members 45 and 46 and is a forced fit for holding the adjustment and parts connected.

The plug 52 has a head 54 thereon which is recessed for conforming to the cross-sectional curvature of the spring clip 36 and to receive the projection 55 formed when counter sinking the head of the screw 53 below the inner contacting surface of the spring clip 36 with the telephone transmitter and receiver unit B, as clearly shown in Figure 10 of the drawings.

The spring clip 36 is a stamping made from spring sheet material, formed substantially U-shape in cross section and provided with inwardly-rolled opposite edges 56 for engaging slightly over the substantially flat surface of the hand-engaging portion of the telephone unit B, as shown in Figures 2 and 10 of the drawings. By referring to Figures 2 and 9 of the drawings it will be observed that the space within the clip 36 is smaller in size at the lower end than it is at the upper end and that the inside of the clip 36 is substantially the size and shape of one tapered end of the hand-engaging portion of the telephone unit B, which prevents sliding movement of the telephone unit B downwardly through the clip 36. By having the clip 36 made of spring steel, the telephone unit B may be forced into the clip until it is in a position where the rolled edges 56 spring over corners of the hand-engaging portion. To remove the telephone unit B from the clip 36, an outward pressure of the unit B will spring the arms of the U-shaped clip 36 apart, disengaging the rolled edges 56 of the clip from the corners of the telephone unit.

In using the improved support the position of the telephone on a desk or table top C, as shown in Figure 3 of the drawings, remains the same as that commonly used, namely, on an angle at the left-hand side of a blotter pad D which covers the central or main work surface of the desk or table. Without changing from this convenient, yet out-of-the-way position of the telephone, the improved support is constructed and arranged for holding the transmitter and receiver unit B at a location for use without the user changing his position at the desk or table. It is to be observed that the transmitter and receiver unit supporting arm is pivoted at the corner of the rectangular base member 20 nearest the central work surface of the desk or table which not only permits the greatest extension towards the said central work surface with the shortest arm, but at the same time locates the pivotal connection and the arm where they are the least conspicuous and are partially hidden from view when in an inoperative position.

Different length arms 21 can be provided to care for elevations and forward extensions of the transmitter and receiver unit B not possible to obtain by adjusting the thumb nut 43.

Figures 11, 12, 13:
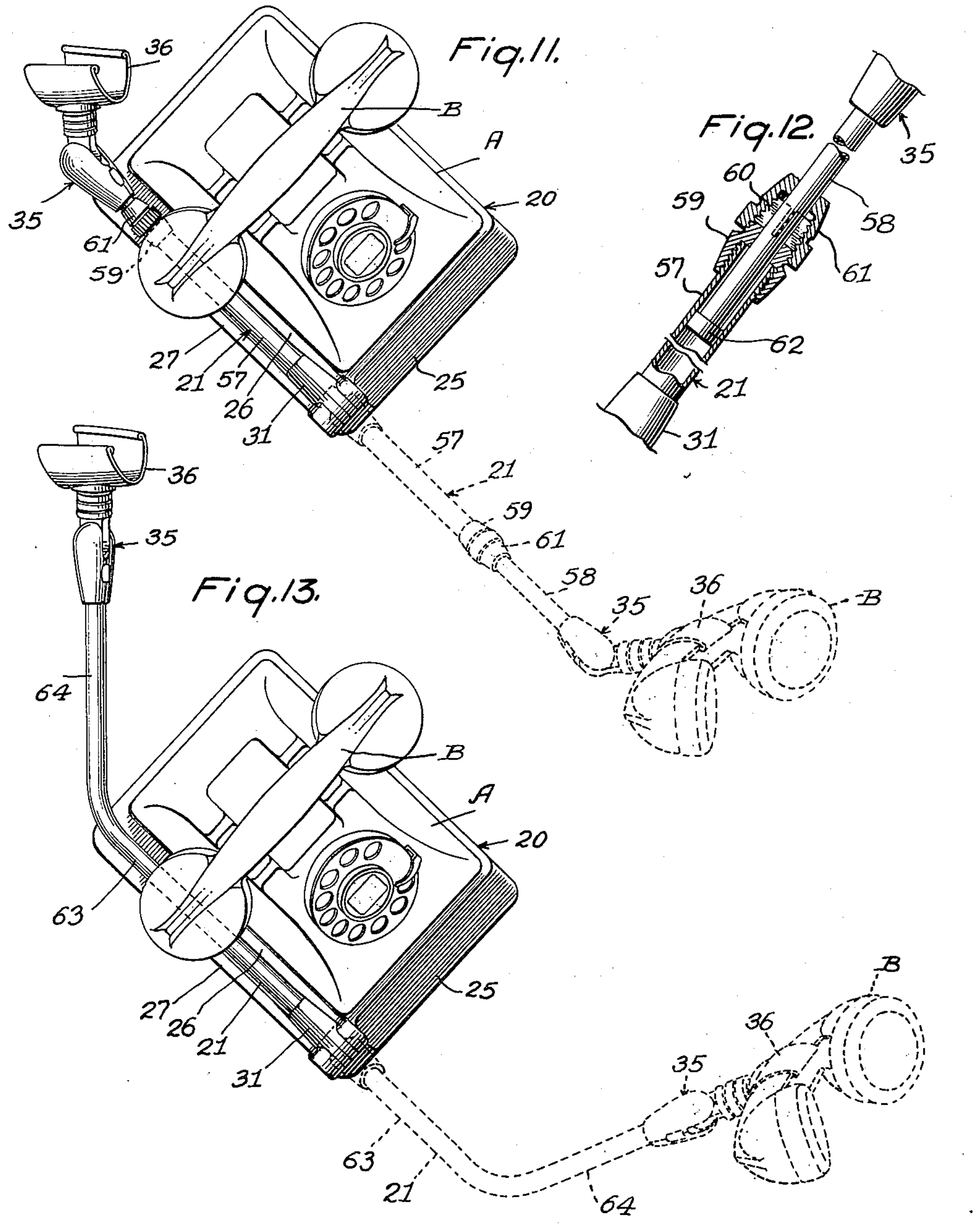
Figure 11 is a plan view of a modified form of the invention showing the movable support located at the other side of a telephone and provided with an extendable member and showing in dotted lines the position of the transmitter and receiver unit when in use.
Figure 12 is a fragmentary longitudinal section through the extension structure of the transmitter and receiver unit supporting member.
Figure 13 is a plan view of a further modified form of invention showing a relatively long transmitter and receiver unit supporting member with angularly arranged portions, and showing in dotted lines the supporting member in operative position.

The form of invention illustrated in Figures 11 and 12 shows the arm 21 as constructed of a tube 57 with a rod 58 slidably arranged therein for providing a telescoping arm, which can be lengthened while supporting the transmitter and receiver unit B and shortened when in its inoperative position. The tube 57 has secured to its outer end a bearing member 59 through which the rod 58 slides and which is split and threaded on a taper, as at 60, for frictionally engaging the rod 58 when a threaded collar 61 is tightened upon the tapered threads for holding the rod 58 in adjusted position with respect to the tube 57. On the end of the rod 58 within the tube 57 is a head 62 for slidably contacting the inner surface of the tube for holding the rod 58 in alignment with the tube 57 and for forming a stop shoulder for engaging the bearing member 59 to limit outward sliding movement of the rod 58. In this form of invention, the telescoping arm 21 is pivoted at the opposite forward corner of the base member 20 for permitting freer access to the number-dialing disc on the base unit A of the telephone when dialing a number with the arm 21 extending forwardly and supporting the transmitter and receiver unit.

Figure 13 of the drawing also shows the arm 21 as being pivoted to the same side of the telephone as that shown in Figure 11, but instead of having the arm telescoping to provide greater length due to the location of the pivotal connection to the base member, said arm is relatively long and is constructed with angularly-arranged portions 63 and 64. The portion 63 of the arm extends in the same general direction as the arms shown in the other forms of invention, while the angled portion 64 in addition to extending rearwardly, extends towards the side of the telephone opposite from that to which the same is pivoted. A construction of this kind when supporting the transmitter and receiver unit locates the same in substantially the same position with respect to the base member as that shown in the preferred form of invention and while not supporting said unit and is in its inoperative position, the angled portion 64 extends in a direction where there is less likelihood of it projecting over the edge of the desk or table top.

When a user of a telephone equipped with the improved support desires to have both hands free for other purposes during a telephone conversation, he merely swings the arm 21 forwardly to its operative position and places the transmitter and receiver unit B of the telephone in the spring clip 36, which supports said transmitter and receiver unit at a location where the user seated at the desk or table is not required to change from his normal position at the desk in order to hear and talk over the telephone. After the telephone conversation has been completed the transmitter and receiver unit B is first disengaged from the spring clip 36, the arm 21 is then swung rearwardly to its inoperative position and the transmitter and receiver unit B returned to its position on the base unit A. Telephone conversations may be conducted in the usual manner without using the improved support and it is only when the user of the telephone desires to have both hands free that the improved support is brought into use.

The yieldable and adjustable stop mechanism 39, 40, 41, 42, 43 and 44, as clearly shown in Figure 4 of the drawings, for adjusting and holding the arm 21 at the different angles with respect to the base member 20, in combination with the adjustable frictional bearing at the pivotal connection of the arm 21 to the base member 20, provides a structure whereby the transmitter and receiver unit B on the arm 21 can be supported at slightly different elevations independent of different adjustments of the thumb nut 43. This is accomplished by having the force of the spring 44 upon compression to act as a counterbalance for opposing downward movement of the arm 21 by the weight of the transmitter and receiver unit thereon and by having a frictional pivotal connection for the arm to yieldably hold the same against movement when the adjusted positions thereof slightly unbalances the opposed forces.

Although the improved telephone support is illustrated and hereinbefore described as an attachment for telephones, it is to be understood that the base member 20 may be omitted and the various elements which are herein shown to be supported thereon and features incorporated therein may be made as a permanent part of the base unit of the telephone in the manufacture thereof.

While several modifications of the invention have been specifically described, it will be understood that other modifications might be devised by those skilled in this art falling within the purview of the invention, and it is intended to cover such modifications in the appended claims.

What is claimed is:

1. A support for a telephone of the type having a base unit and a transmitter and receiver unit, comprising a base member upon which said telephone base unit rests, an upstanding flange on one side of said base member and at one side of said base unit, a plate of similar size and shape as said flange secured to said flange, said flange and plate being recessed inwardly from their joining surfaces adjacent their forward ends, an arm, oppositely directed trunnions on said arm received in said recesses of said flange and plate for pivotally supporting the arm, and means on the free end of said arm for detachably supporting a transmitter and receiver unit.

2. A support for a telephone of the type having a base unit and a transmitter and receiver unit, comprising a base member upon which said telephone base unit rests, an upstanding flange on one side of said base member and at one side of said base unit, a plate of similar size and shape as said flange secured to the outer face of said flange, said flange and plate being recessed inwardly from their joining surfaces adjacent their forward ends, an arm, oppositely directed trunnions on said arm received in said recesses of said flange and plate for pivotally supporting the arm, said flange and plate also having other recesses therein extending from their adjoining sides, an adjustable stop mechanism located in said last-mentioned recesses for limiting pivotal movement of said arm, and means on said arm for attaching the transmitter and receiver unit.

3. A support for a telephone of the type having a base unit and a transmitter and receiver unit, comprising a member held by the base unit, an arm pivotally connected to said member forwardly of the base unit and movable to a position extending rearwardly or to a position extending upwardly and forwardly of said base unit, a rod pivotally connected at one end to said arm at a point spaced from the pivot of said arm, a cross pin pivoted on said member supported by the base and provided with an opening through which said rod slidably extends, an adjusting nut threaded on said rod, a compression coil spring on said rod between said cross pin and nut for yieldably limiting forward movement of said arm, and means on the free end of said arm for detachably supporting the transmitter and receiver unit.

4. For a telephone of the type having a base unit and a transmitter and receiver unit, a support comprising an arm with one end thereof pivoted forwardly of and at one side of the front lower portion of the base unit and movable on its pivot for assuming a position extending rearwardly from the front portion of the base unit adjacent and along one side of said base unit and under and beyond an end of the transmitter and receiver unit at rest on the base unit and wholly detached from said transmitter and receiver unit for use of the telephone in the customary manner, a stationary rest against which said pivoted arm is swung and is supported when said arm is in its rearward position, said arm also being movable on its pivot to assume a position extending forwardly and upwardly from the front lower portion of the base unit, an adjustable rest independent of said first-mentioned stationary rest for supporting said pivoted arm when said arm is in its forward and upward position, and means on the extended end of said arm that engage and detachably hold the transmitter and receiver unit upon placing of said unit thereon for supporting said transmitter and receiver unit by said arm when said arm is projected forwardly and upwardly.

5. For a telephone of the type having a base unit and a transmitter and receiver unit, a support comprising an arm with one end thereof pivoted forwardly of and at one side of the front lower portion of the base unit and movable on its pivot for assuming a position extending rearwardly from the front portion of the base unit adjacent and along one side of said base unit and under and beyond an end of the transmitter and receiver unit at rest on the base unit and wholly detached from said transmitter and receiver unit for use of the telephone in the customary manner, a stationary ledge along one side of the major portion of the base unit extending rearwardly from the pivot of said arm on which said pivoted arm is swung to rest when said arm is in its rearward position, said arm also being movable on its pivot to assume a position extending forwardly and upwardly from the front lower portion of the base unit, an adjustable rest independent of said first-mentioned stationary ledge for supporting said pivoted arm when said arm is in its forward and upward position, and means on the extended end of said arm that engage and detachably hold the transmitter and receiver unit upon placing of said unit thereon for supporting said transmitter and receiver unit by said arm when said arm is projected forwardly and upwardly.

REGINALD W. HOAGLAND.

REFERENCES CITED

The following references are of record in the file of this patent:

UNITED STATES PATENTS

| Number | Name | Date |
|---|---|---|
| 2,020,527 | Swaine | Nov. 12, 1935 |
| 2,048,865 | Hufschmid | July 28, 1936 |
| 2,260,703 | Daly | Oct. 28, 1941 |
| 2,310,032 | Mathieson | Feb. 2, 1943 |

FOREIGN PATENTS

| Number | Country | Date |
|---|---|---|
| 112,209 | Austria | Feb. 11, 1929 |